United States Patent
Morgan

(10) Patent No.: US 6,831,599 B2
(45) Date of Patent: Dec. 14, 2004

(54) REMOTE VELOCITY SENSOR SLAVED TO AN INTEGRATED GPS/INS

(75) Inventor: Kenneth S. Morgan, St. Petersburg, FL (US)

(73) Assignee: Honeywell International Inc., Morristown, NJ (US)

(*) Notice: Subject to any disclaimer, the term of this patent is extended or adjusted under 35 U.S.C. 154(b) by 0 days.

(21) Appl. No.: 10/227,664

(22) Filed: Aug. 26, 2002

(65) Prior Publication Data

US 2004/0036650 A1 Feb. 26, 2004

(51) Int. Cl.$^7$ .................................................. G01S 5/14
(52) U.S. Cl. ............................ 342/357.14; 342/357.02; 701/216
(58) Field of Search ....................... 342/357.14, 357.11, 342/357.02; 701/216, 221

(56) References Cited

U.S. PATENT DOCUMENTS

| | | | |
|---|---|---|---|
| 4,402,049 A | * | 8/1983 | Gray ........................... 701/205 |
| 5,379,224 A | | 1/1995 | Brown et al. |
| 5,483,457 A | | 1/1996 | Shibata et al. |
| 5,539,647 A | | 7/1996 | Shibata et al. |
| 5,590,044 A | | 12/1996 | Buckreub |
| 5,672,872 A | * | 9/1997 | Wu et al. .................... 250/330 |
| 5,894,323 A | | 4/1999 | Kain et al. |
| 6,037,893 A | * | 3/2000 | Lipman ........................ 342/25 |
| 6,094,163 A | * | 7/2000 | Chang .................... 342/357.06 |
| 6,122,595 A | * | 9/2000 | Varley et al. ................ 701/220 |
| 6,240,367 B1 | | 5/2001 | Lin |

OTHER PUBLICATIONS

Loffler, Thomas et al, "A GPS/INS Missile Upgrade that Improves Effectiveness and Minimizes Friendly–Fire Accidents" IEEE Apr. 2002, pp. 106–112.*

Cao Fuxiang et al: "Motion Compensation for Airborne SAR", pp. 1864–1867, vol. 3, Proceedings of ICSP2000.

International Search Report dated Dec. 22, 2003, Application No. PCT/US 03/26547, 5 pages.

* cited by examiner

Primary Examiner—Gregory C. Issing
(74) Attorney, Agent, or Firm—Matthew Luxton, Esq.; Armstrong Teasdale LLP

(57) ABSTRACT

A unit is configured to provide acceleration, velocity, and position information for one or more points on a vehicle. The unit includes an integrated global positioning satellite system (GPS)/inertial navigation system (INS) and at least one remote velocity sensor. The remote velocity sensors include three orthogonal accelerometers and a digital signal processor configured to receive signals from the accelerometers. The remote velocity sensors are mounted at points on the vehicle where acceleration, velocity and position are to be determined. Data from the sensors is slaved to data from the integrated GPS/INS, and the unit is configured to transform data from the sensors to a navigation frame utilizing a sensor frame to navigation frame attitude matrix.

22 Claims, 8 Drawing Sheets

REMOTE VELOCITY SENSOR SLAVED TO AN INTEGRATED GPS/INS

BACKGROUND OF THE INVENTION

This invention relates generally to accurate determinations of position, and more specifically to, integration of global positioning satellite (GPS) units and inertial navigation systems (INS) units with remote velocity sensors (RVS).

Known integrated GPS/INS units are capable of providing accurate position, velocity, attitude, and acceleration data, either through a user interface or as data that is communicated to another control system. However, transforming such data to points on a vehicle a distance away from the GPS/INS units, for example, at a location of the GPS antenna, can result in an unacceptably large position, velocity, and acceleration noise. The noise results due to the effect of the distance between a sensor of the INS, at a first point on the vehicle, and the point of interest, at a second point on a vehicle.

Accurate determinations of velocity and acceleration for different points on a vehicle are needed to aid in operation of GPS tracking loops and synthetic aperture radars. A purpose for a remote velocity sensor is to provide accurate acceleration, velocity, and position data at any point in a vehicle, and providing such data at a low noise level.

BRIEF SUMMARY OF THE INVENTION

In one aspect, a unit configured to provide acceleration, velocity, and position information for one or more points on a vehicle is provided. The unit comprises an integrated global positioning satellite system (GPS)/inertial navigation system (INS) and at least one remote velocity sensor. The remote velocity sensors comprise three orthogonal accelerometers and a digital signal processor configured to receive signals from the accelerometers. The remote velocity sensors are mounted at points on the vehicle where acceleration, velocity and position are to be determined. Data from the sensors is slaved to data from the integrated GPS/INS, and the unit is configured to transform data from the sensors to a navigation frame utilizing a sensor frame to navigation frame attitude matrix.

In another aspect a method for removing a low frequency drift in data from a remote velocity sensor is provided. The remote velocity sensor includes a digital signal processor (DSP) and three orthogonal accelerometers which provide signals to the DSP which generates the data. The remote velocity sensor is configured for communication with an integrated GPS/INS. The provided method comprises receiving data from the remote velocity sensor, receiving data from the integrated GPS/INS, and transforming the data from the remote velocity sensor to the data from the integrated GPS/INS using a sensor frame to navigation frame attitude matrix.

In still another aspect, a filter is provided which is configured to receive GPS/INS position, velocity, and attitude data and remote velocity sensor (RVS) position and velocity data. The filter separately integrates both GPS/INS velocity and RVS velocity over a filter period. A difference between the RVS velocity integration and the GPS/INS integration is formed and a RVS velocity solution is corrected based on the difference.

DETAILED DESCRIPTION OF THE INVENTION

Figure 1:
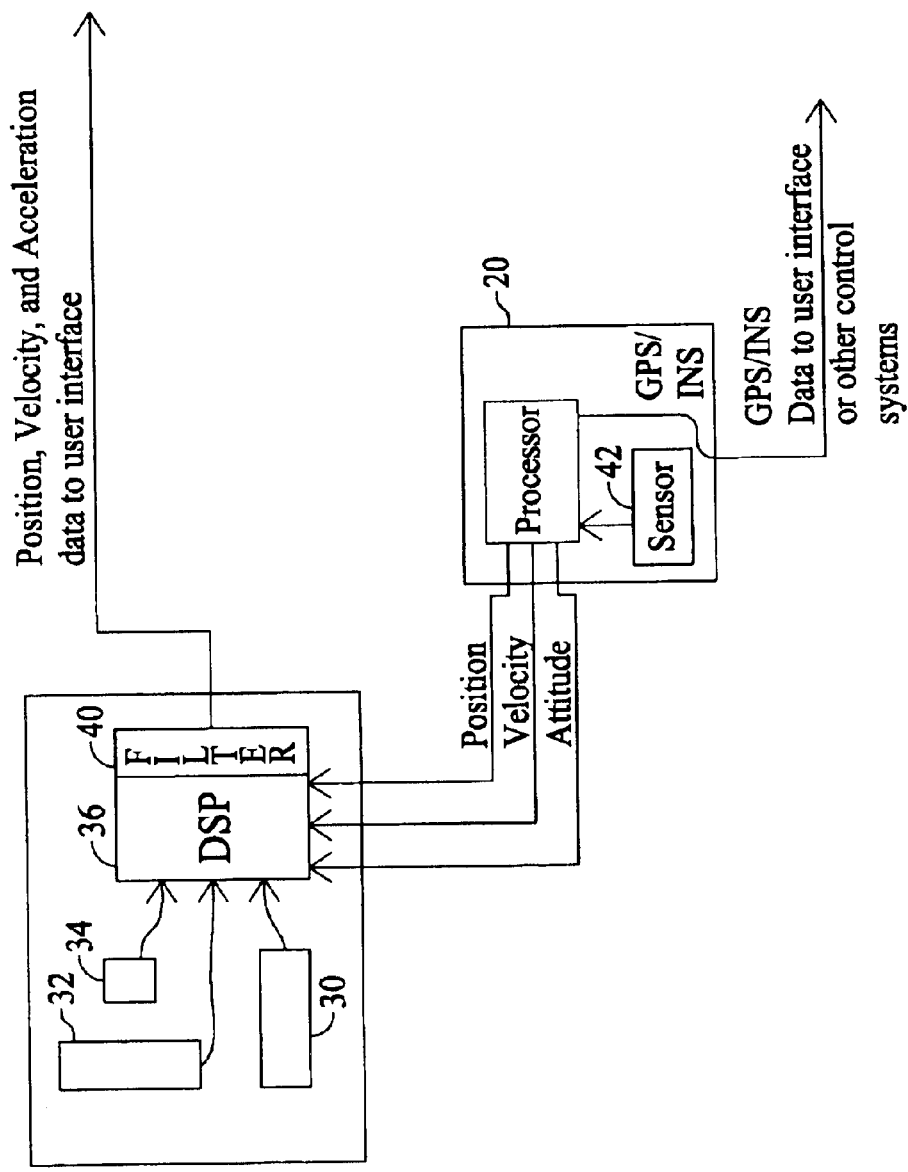
FIG. 1 illustrates one embodiment of a remote velocity sensor slaved to a GPS/INS system.

FIG. 1 is a diagram of a remote velocity sensor (RVS) 10 slaved to a GPS/INS system 20. Together RVS 10 and GPS/INS system 20 form a navigation unit. RVS 10 includes three orthogonally positioned accelerometers 30, 32, 34 and a digital signal processor (DSP) 36. In a preferred embodiment, accelerometers 30, 32, 34 exhibit a good high frequency response, but can have large low frequency errors. In one embodiment, attitude information from GPS/INS system 20 is combined with the accelerometer data, in the form of acceleration, velocity, and position data from RVS 10 to form position, velocity, and acceleration information at a point of interest on a vehicle. For example, RVS 10 is placed in a vehicle, at a position where it is desired to know position, velocity, and acceleration. Examples might include, a point within a fuselage or a wing of an aircraft. In the embodiment shown, RVS 10 provides an output to a user interface or other system.

Figure 3:
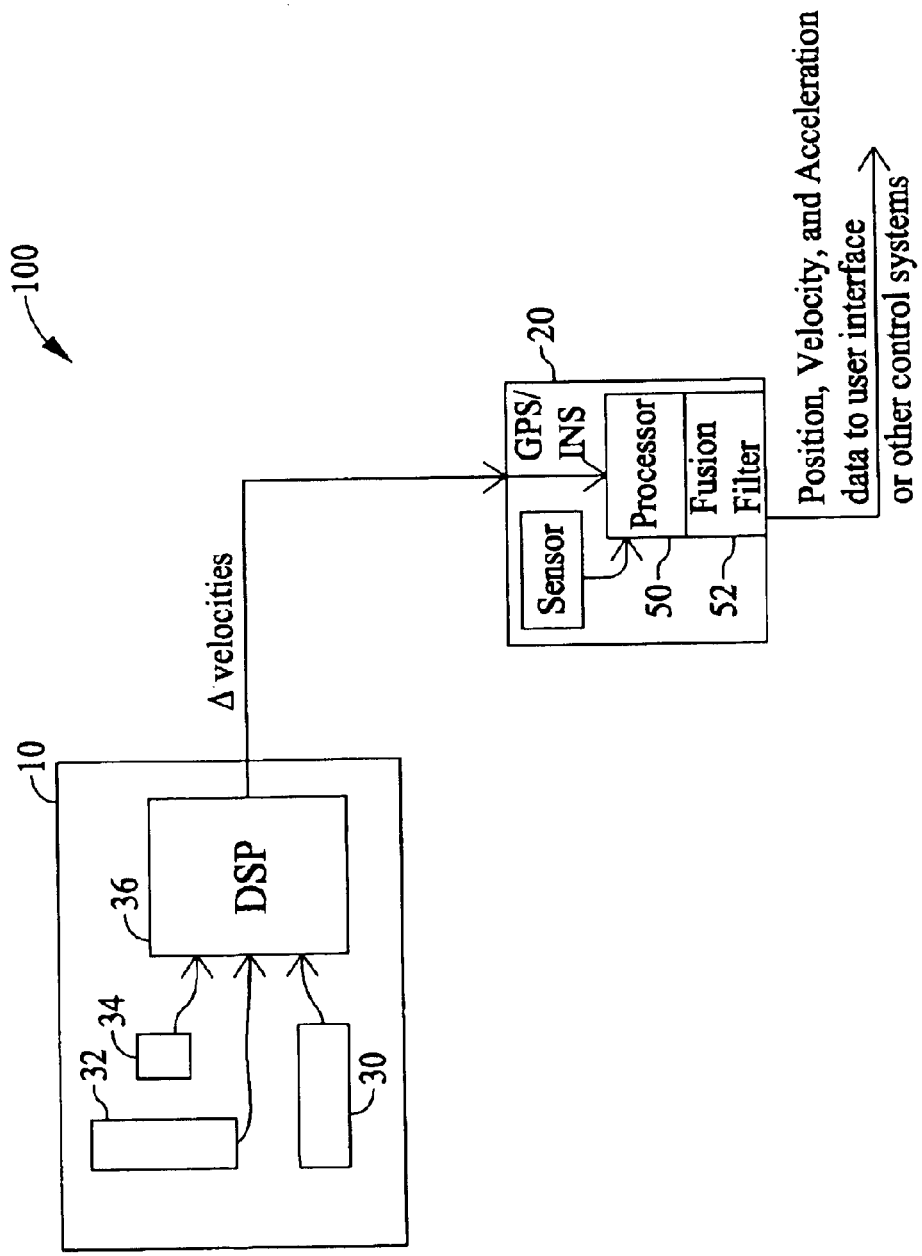
FIG. 3 illustrates an alternative embodiment of a remote velocity sensor slaved to a GPS/INS system.

In the embodiment illustrated by FIG. 1, a low frequency drift in a velocity data from RVS 10 is removed by slaving the velocity data from RVS 10 to a velocity as determined by GPS/INS system 20. In alternative embodiments, the position, velocity, and acceleration data from RVS 10 is either provided through DSP 36 of RVS 10 (as illustrated in FIG. 1) or developed within a processor contained in GPS/INS system 20 (as illustrated in FIG. 3). RVS 10 includes input/output (I/O) capability to receive position, velocity, and attitude information from GPS/INS system 20. DSP 36 in RVS 10 uses the attitude information from GPS/INS system 20 to provide position, velocity, and acceleration information at the point of interest, for example, at a particular point of a vehicle.

If the position, velocity, and acceleration data is formed in RVS 10, position, velocity, and attitude data is sent from GPS/INS system 20 to DSP 36 of RVS 10. Outputs of the three accelerometers 32, 34, 36 are transformed through an attitude matrix (not shown) provided by GPS/INS system 20. The transformed accelerometer outputs are then integrated to determine a velocity in a navigation frame (described with respect to FIG. 2). Additionally, the velocity is integrated to determine a position in the navigation frame. Through utilization of the attitude matrix and the navigation frame, the position and velocity data from RVS 10 is slaved to position and velocity outputs of GPS/INS system 20.

In one embodiment, a fusion filter 40 is incorporated into DSP 36 and configured to take advantage of the high frequency accuracy of RVS 10 and the low frequency accuracy of GPS/INS system 20. Fusion filter 40 is then applied both to the velocity from GPS/INS system 20 as transformed to a position of RVS 10 and the velocity generated by RVS 10. A difference between the two velocities is calculated and the difference is used to remove low frequency errors in the velocity data output by filter 40. The same differencing technique is used to correct the position data from RVS 10. The corrected velocity and position data from RVS 10 removes noise which is associated with translation of the position, velocity, and acceleration information provided by GPS/INS system 20 from a position of sensors 42 for GPS/INS system 20 the point of interest, the position of RVS 10.

Figure 2:
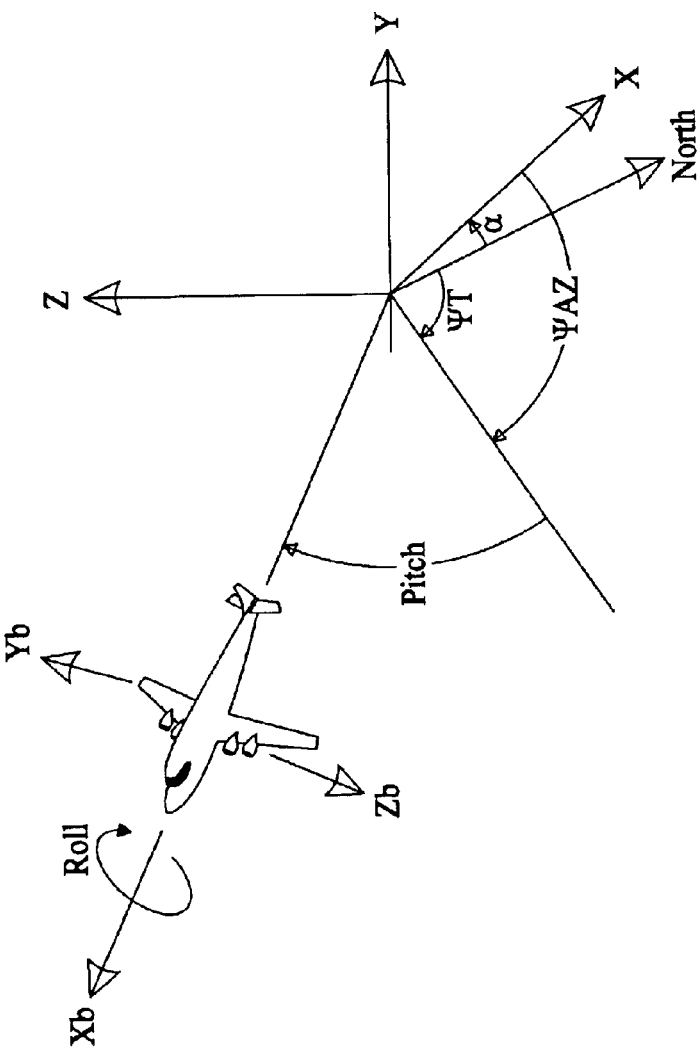
FIG. 2 is an illustration of a relationship between an aircraft body frame and a navigation frame.

As used herein, a navigation frame is a reference frame used to define a navigation solution. FIG. 2 illustrates a relationship between an aircraft body frame and a navigation frame. For RVS 10, a sensor reference frame is aligned with the aircraft body frame. Navigation frames typically consist of three orthogonal components. Navigation frames used for earth based navigation typically are of one of two types, earth centered earth fixed (ECEF) or geodetic wander azimuth. ECEF reference frames have three axes that are fixed relative to the earth. A typical ECEF reference frame will have an origin at the center of the earth, one axis out the earth's north pole, one axis out the equator along the Greenwich meridian, and one axis perpendicular to these two axes. A wander azimuth navigation frame is a three axis navigation frame in which the third axis is perpendicular to the surface of the earth and the other two axis are parallel to the surface of the earth and perpendicular to each other, as shown in FIG. 2.

The sensor reference frame is a reference frame nominally aligned with the three orthogonal accelerometers. The attitude matrix for GPS/INS 20 is a matrix that allows information in the sensor reference frame to be transformed into information in the navigation frame. GPS/INS 20 maintains attitude matrices by integrating the output of three orthogonal rate integrating gyros that are mounted fixed to a vehicle. The attitude matrix is a direction cosine matrix that solves the following equation.

$\Re_N = C_S^N \times \Re_S$, where $\Re_N$ is a vector in the navigation frame N, $\Re_S$ is a vector in the sensor reference frame S, and $C_S^N$ is an attitude matrix representing the transformation from sensor reference frame S to navigation frame N.

FIG. 3 illustrates an embodiment of a navigation unit 100 where position, velocity, and acceleration outputs of RVS 10 are formed within a processor 50 which is contained within GPS/INS system 20. As an alternative to the navigation unit described in FIG. 1 above, combinations of velocities from RVS 10 and GPS/INS 20 are formed within GPS/INS 20. To enable such computations, compensated high frequency delta velocities are sent to GPS/INS 20 from RVS 10. Outputs of the three accelerometers 30, 32, 34, through DSP 36, are transformed through an attitude matrix (not shown) within GPS/INS system 20. The transformed accelerometer outputs are then integrated by processor 50, which includes a fusion filter 52, to determine a delta velocity in a navigation frame (shown in FIG. 2) within GPS/INS system 20. A delta velocity represents an integral of the acceleration over an inertial sample rate. In some embodiments, the inertial sample rate ranges between 1/7200 of a second to 1/50th of a second. Additionally, velocities from RVS 10 are integrated to determine a position in the navigation frame. Through utilization of the attitude matrix and the navigation frame, the position and velocity data from RVS 10 are slaved to position and velocity as determined by GPS/INS system 20.

Fusion filter 52 is configured to take advantage of the high frequency accuracy of RVS 10 and the low frequency accuracy of GPS/INS system 20. The velocity as measured by GPS/INS system 20 as transformed to a position of RVS 10 and the velocity as measured by RVS 10 are both applied to fusion filter 52. A difference between the two velocities is calculated and the difference is used to remove low frequency errors within the velocity as measured by RVS 10. The differencing technique is also used to correct position data from RVS 10. The corrected velocity and position data 10 removes noise which is associated with translation of the position, velocity, and acceleration information provided by GPS/INS system 20 from a position of sensors for GPS/INS system 20 to the point of interest, the position of RVS 10.

Figure 4:
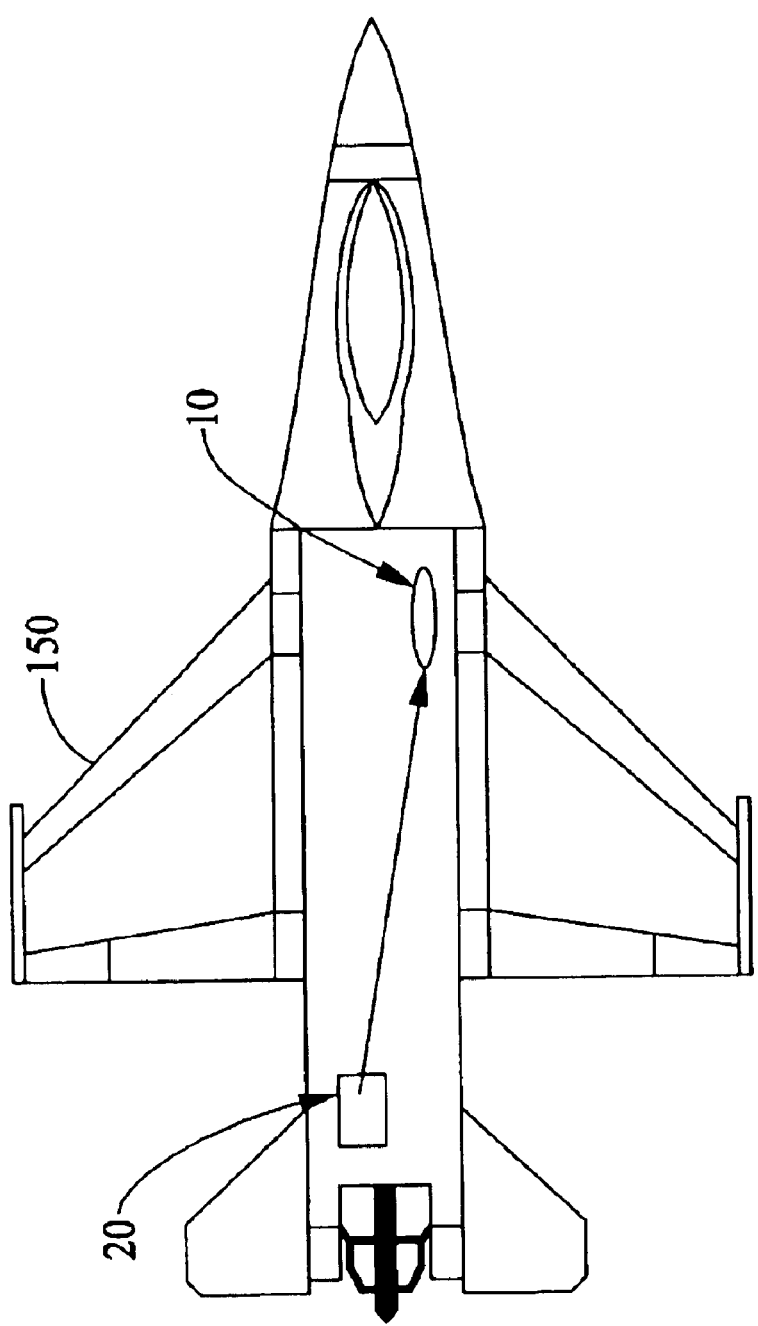
FIG. 4 illustrates placement of remote velocity sensors at particular points within a vehicle, with respect to placement of a GPS/INS system.

FIG. 4 illustrates a vehicle 150 which includes a RVS 10 at a location within vehicle 150. The location of RVS 10 is a location within vehicle where it is desired to have accurate acceleration, velocity, and positional data. As described above, RVS 10 is configured to communicate, as described above, with GPS/INS system 20, which as shown, is located at a different position within vehicle 150. In alternative embodiments, multiple RVS 10 may be deployed at various locations within a vehicle 150. The multiple locations are those locations where it is desirable to obtain acceleration, velocity and positional data.

As indicated above, RVS 10 provides accurate acceleration, velocity, and position information at any point within vehicle 150. Integrated GPS/INS units, for example, GPS/INS system 20, are capable of providing accurate position, velocity, attitude, and acceleration data. However, translating this data to other points within vehicle 150 can result in unacceptably large velocity noise levels due to the effect of a distance between a center of the sensors for GPS/INS system 20 and the other points of interest of vehicle 150. RVS 10 provides a simple solution to the velocity noise problem, when it is integrated with an accurate INS, such as GPS/INS system 20.

Fusion filter 40 (shown in FIG. 1) and fusion filter 52 (shown in FIG. 3) are state space filters, i.e., filters that model errors as states that get propagated over time. Fusion filter 40 and fusion filter 52 each blend the outputs of RVS 10 and GPS/INS system 20, and model all significant error sources that effect these devices. In one embodiment, fusion filter 40 is a combination of a Kalman filter and a fixed gain filter. In an alternative embodiment, fusion filter 52 is a combination of a Kalman filter and a fixed gain filter. The error sources that are modeled in these fusion filters include, but are not limited to, an error in the RVS generated velocity, an error in the RVS generated position, and an accelerometer input axis misalignment error. The accelerometer input axis misalignment error describes how the accelerometers do not perfectly align, with the sensor reference frame defined by the gyro's in GPS/INS 20. The X axis accelerometer does not align perfectly with the X gyro, the Y accelerometer does not align perfectly with the Y gyro, and the Z accelerometer does not align perfectly with the Z gyro.

Another error source that is modeled in fusion filter 40 and 52 includes an accelerometer bias error, where, with zero input, the accelerometer should have zero output. Accelerometer bias is the output of the accelerometer when the true input is zero. Still another error source is an accelerometer scale factor error which is an error in the accelerometer output that is a function of true accelerometer input. This error increases as the accelerometer input increases. Another error source modeled in fusion filter 40 and 52 is a GPS/INS to RVS lever arm error. A GPS/INS to RVS lever arm is a vector that defines the location of RVS 10 relative to the GPS/INS 20. The lever arm error is the error in the measurement used to define the relative location of the two devices.

Figure 5:
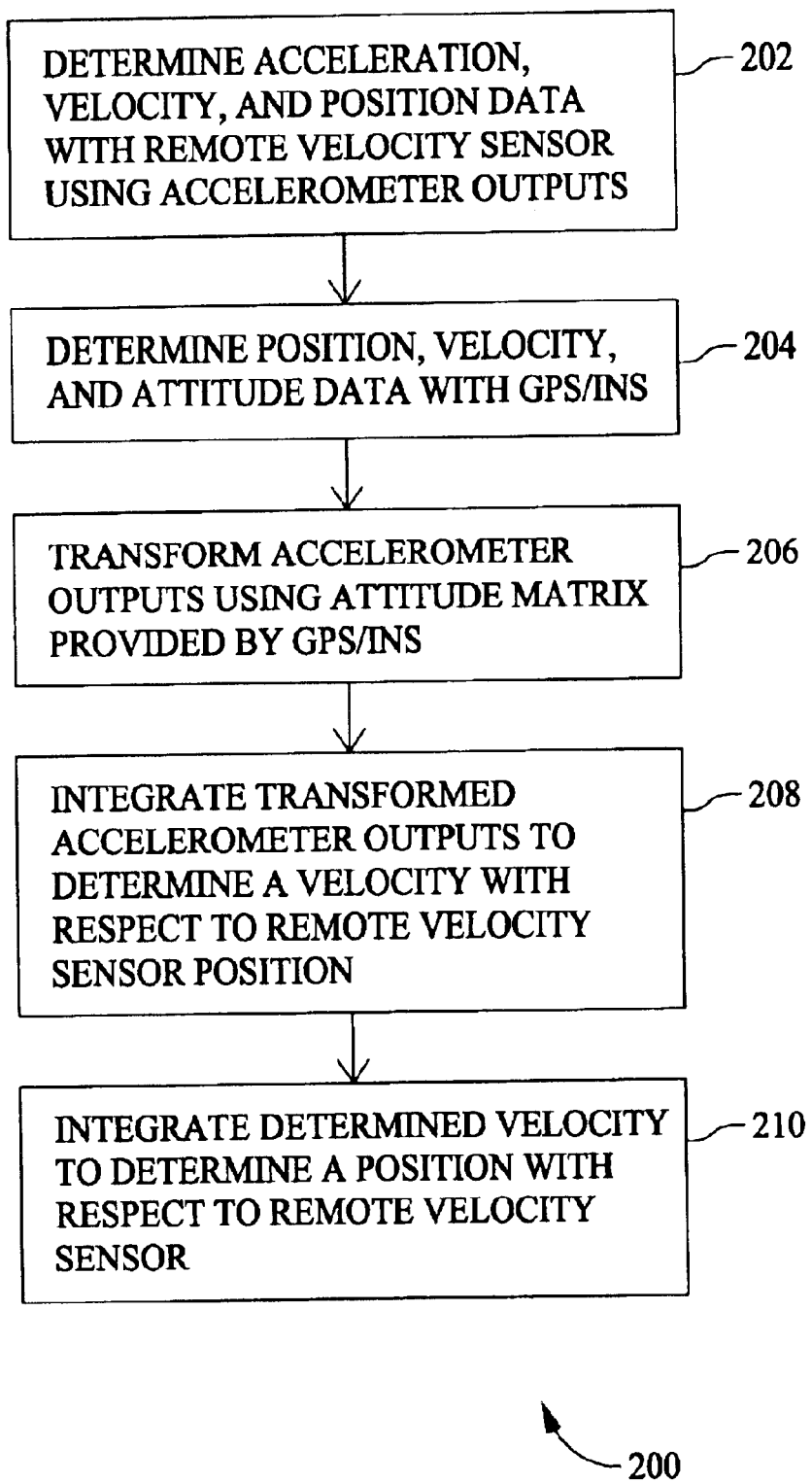
FIG. 5 is a flowchart illustrating a method performed by slaving a remote velocity sensor to a GPS/INS system.

FIG. 5 is a flowchart 200 illustrating a method performed by slaving a remote velocity sensor to a GPS/INS system as above described. First, acceleration, velocity, and position data are determined 202 by RVS 10 utilizing accelerometer outputs. Position, velocity and attitude data are determined 204 utilizing GPS/INS system 20. Outputs of accelerometers 30, 32, 34 (shown in FIGS. 1 and 3) are transformed 206 through the attitude matrix provided by GPS/INS system 20. These outputs are then integrated 208 to determine a velocity with respect to a position of RVS 10. The velocity output is also integrated 210 to determine a position with respect to a position of RVS 10. Position and velocity outputs of RVS 10 are slaved to the position and velocity output of the GPS/INS 20.

Figure 6:
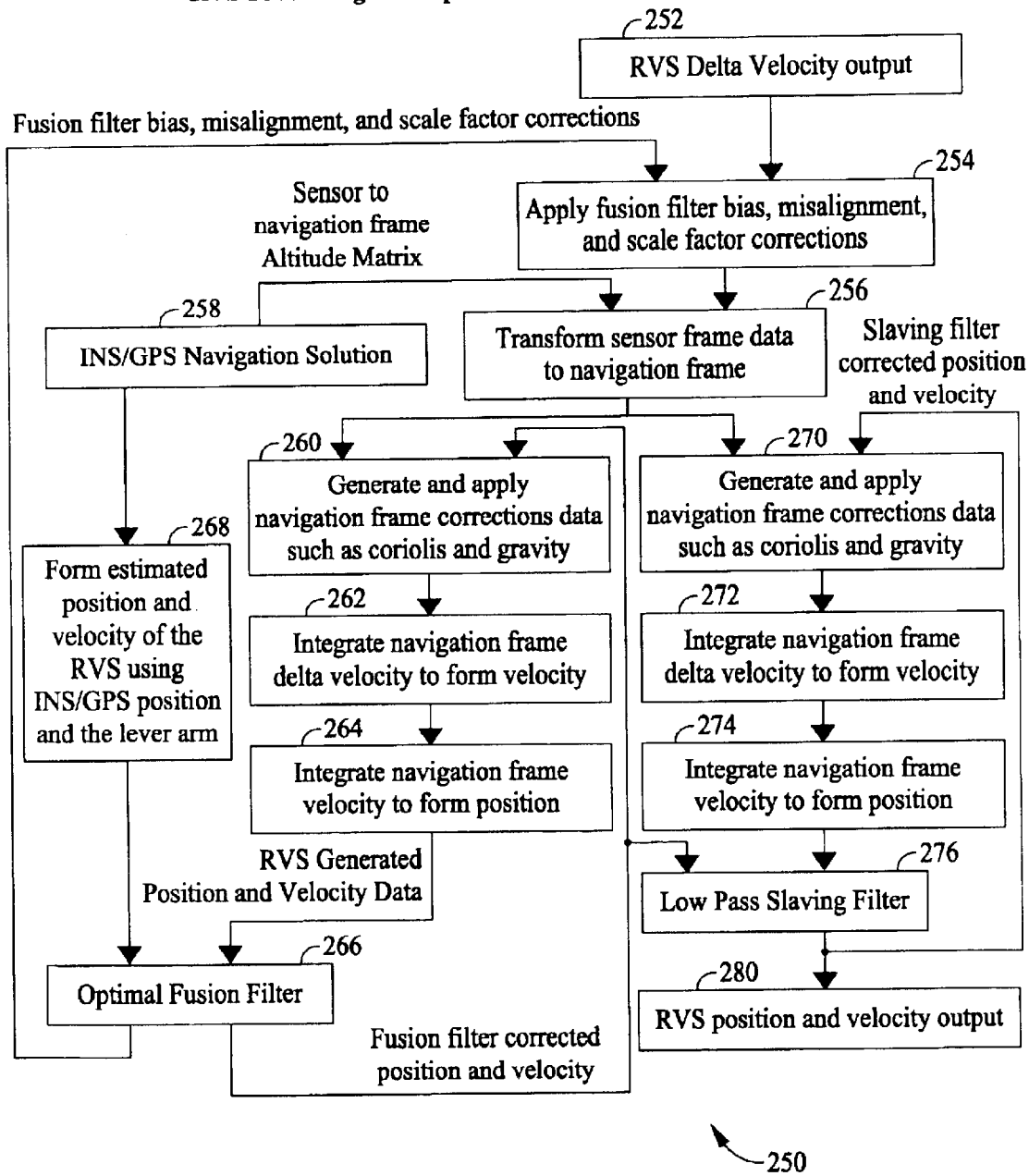
FIG. 6 is a flowchart illustrating remote velocity sensor processing.

FIG. 6 is a flowchart 250 illustrating remote velocity sensor (RVS) processing. A RVS delta velocity output 252 is adjusted by applying 254 at least one of a fusion filter bias correction, a misalignment correction, and scale factor corrections. The adjusted output is transformed 256 from sensor frame data to navigation frame data utilizing a sensor to navigation frame attitude matrix from a GPS/INS navigation solution 258. The transformed navigation frame data is combined, in separate processes, with fusion filter corrected position and velocity and slaving filter corrected position and velocity.

With respect to fusion filter corrected position and velocity, navigation frame correction data is generated 260 and applied. Examples of correction data include coriolis and gravity corrections. Navigation frame delta velocities are integrated 262 to form velocity and velocity is integrated 264 to form position. The position and velocity data is then filtered 266 with the fusion filter along with an estimated position and velocity 268 of the RVS generated utilizing GPS/INS position.

With respect to slaving filter corrected position and velocity, navigation frame correction data (coriolis and gravity corrections) is generated 270 and applied. Navigation frame delta velocities are integrated 272 to form velocity and velocity is integrated 274 to form position. The position and velocity data is then filtered 276 utilizing the slaving filter, along with fusion filter corrected position and velocity, to generate an RVS position and velocity output 280.

Figure 7:
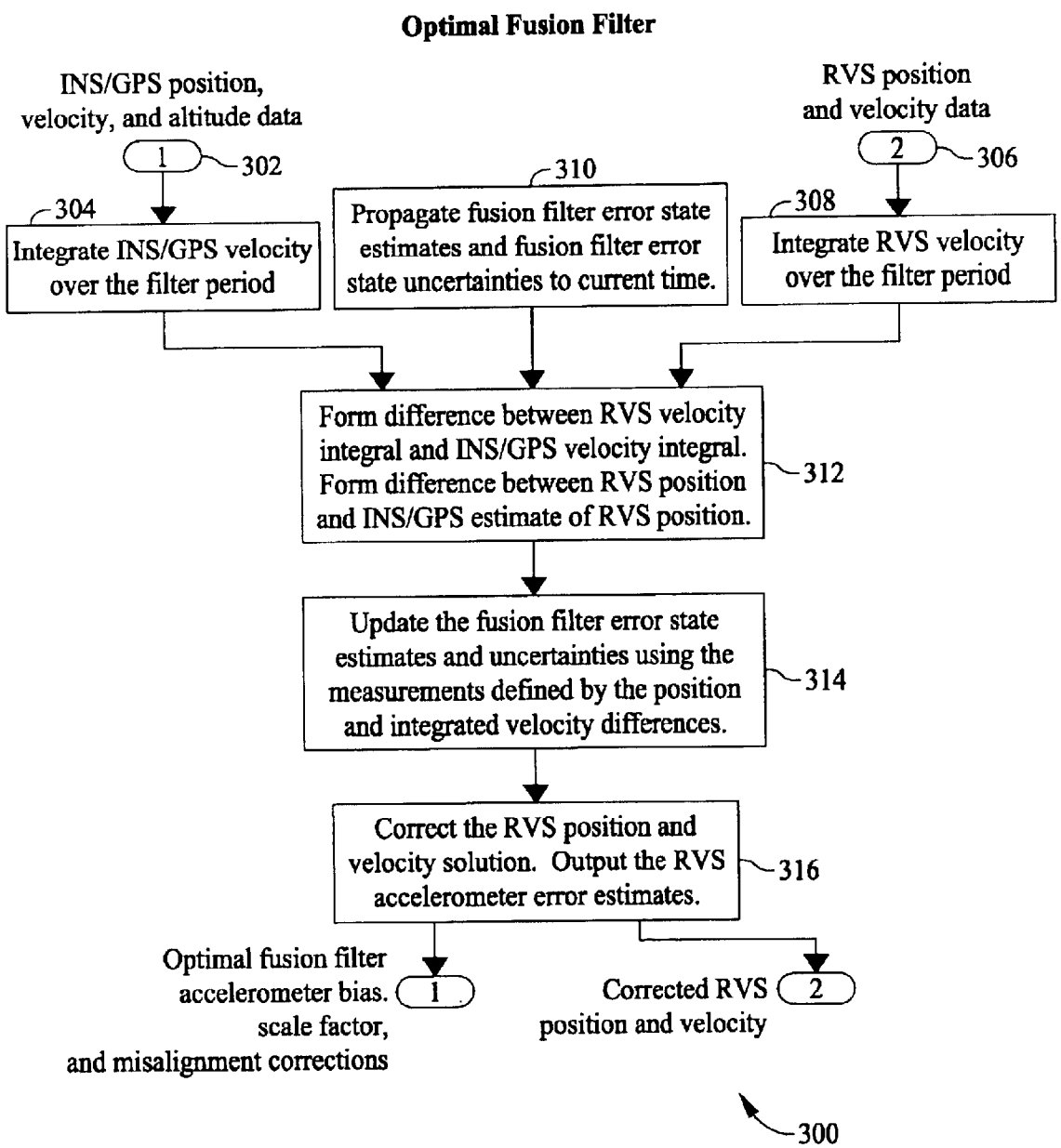
FIG. 7 is a flowchart illustrating operation of a fusion filter.

FIG. 7 is a flowchart 300 illustrating operation of the fusion filter described with respect to FIG. 6. As described above, the fusion filter receives 302 GPS/INS position velocity and attitude data. The fusion filter integrates 304 GPS/INS velocity over a period of the filter. The fusion filter also receives 306 RVS position and velocity data and integrates 308 RVS velocity over the filter period. The fusion filter is further configured to propagate 310 fusion filter error state estimates and uncertainties to a current time. A difference between the integrated 308 RVS velocity and the integrated 304 GPS/INS velocity is formed 312, as is a difference between RVS position and an GPS/INS estimate of RVS position. Fusion filter error state estimates and uncertainties are updated 314 using measurement defined by position and integrated velocity differences. The RVS position and velocity solution is corrected 316 and output, as are RVS accelerometer error estimates, including, but not limited to, accelerometer bias, scale factor and misalignment corrections.

Figure 8:
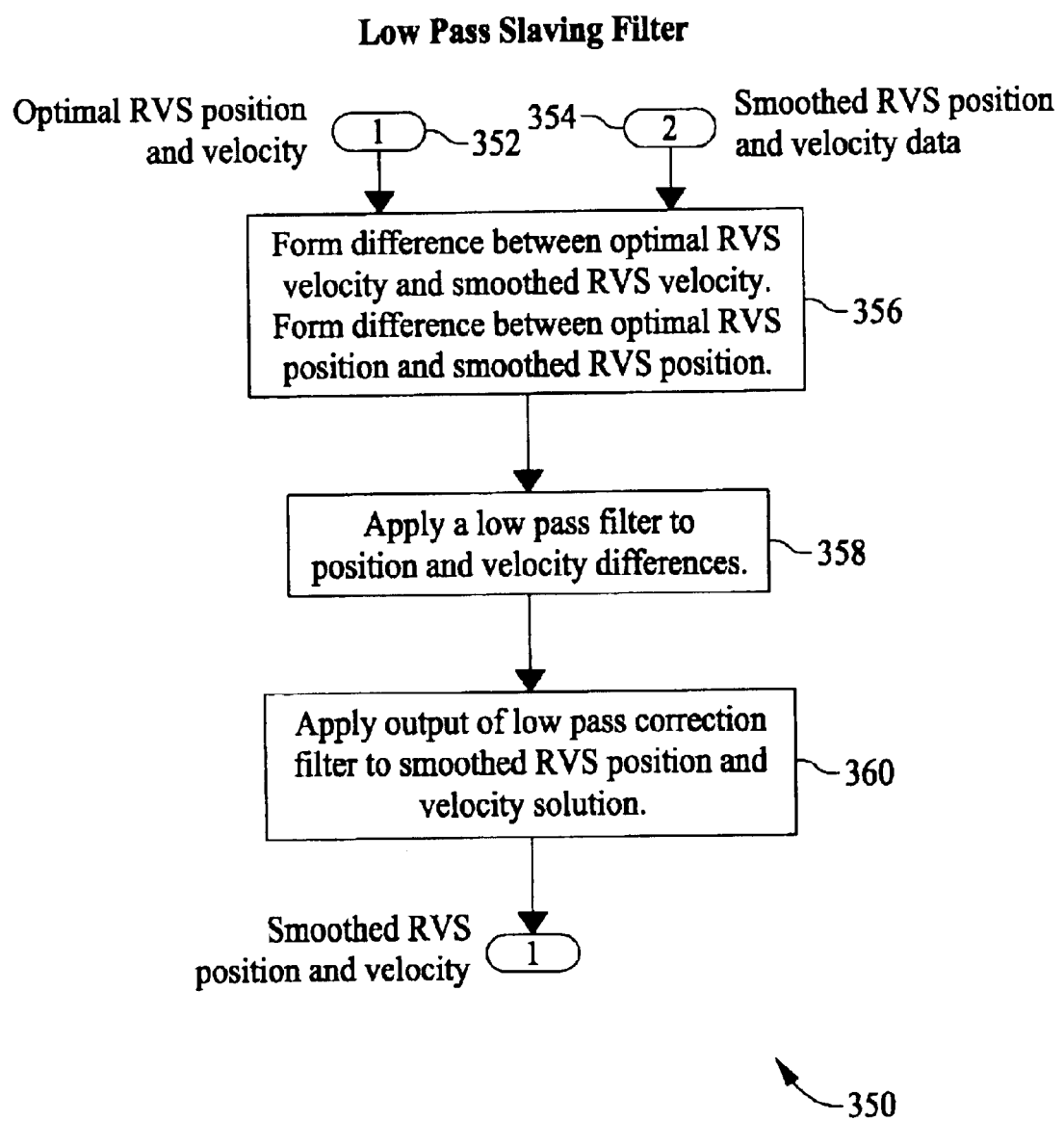
FIG. 8 is a flowchart illustrating operation of a low pass slaving filter.

FIG. 8 is a flowchart 350 illustrating operation of the low pass slaving filter described with respect to FIG. 6. RVS position and velocity, as determined by the fusion filter, is input 352 into the slaving filter. Smoothed RVS position and velocity data is also input 354 into the slaving filter. A difference is formed 356 between the RVS position from the fusion filter and the smoothed RVS position. A difference is also formed 356 between the velocities as input to the slaving filter. A low pass filter is applied 358 to the position and velocity differences, and an output of the low pass filter is applied to the smoothed RVS position and velocity solution, which input in the next filtering cycle.

The combination of multiple RVS 10 and GPS/INS system 20 as a navigation unit is suited for use with Anti-Jamming type GPS Antennas since these antennas require accurate attitude control in order to properly form the nulling beam in the direction of a jamming signal. Such Anti-Jamming type GPS Antennas include, but are not limited to, controlled reception pattern antennas (CRPA) and other beam forming/carrier phase tracking GPS antennas. Additionally and more importantly, the velocity and acceleration data is critical for accurate carrier phase tracking and carrier loop tracking. The above described remote velocity sensor utilizes a small package which therefore mitigates some current GPS industry proposals which will utilize an inertial measurement unit co-located with the GPS antenna. Additional applications of the above described remote velocity sensor include providing velocity and acceleration data to a synthetic aperture radar. Removing the low frequency drift of the accelerometers in the RVS allows the use of accelerometers with large low frequency error characteristics. These accelerometers are typically less expensive than the accelerometers in a high accuracy GPS/INS.

While the invention has been described in terms of various specific embodiments, those skilled in the art will recognize that the invention can be practiced with modification within the spirit and scope of the claims.

What is claimed is:

1. A unit configured to provide acceleration, velocity, and position information for one or more points on a vehicle, said unit comprising:
   an integrated global positioning satellite system (GPS)/inertial navigation system (INS); and
   at least one remote velocity sensor, said sensors comprising three orthogonal accelerometers, and a digital signal processor configured to receive signals from said accelerometers, said sensor mounted at a location on the vehicle where acceleration, velocity and position are to be determined, data from said sensor to be slaved to position, velocity and attitude data from said integrated GPS/INS to remove a drift in velocity data from said at least one remote velocity sensor, said unit configured to transform data from said sensor to a navigation frame utilizing a sensor frame to navigation frame attitude matrix, where the sensor frame is aligned with a vehicle body frame.

2. A unit according to claim 1 wherein said unit is configured to combine a velocity from said sensor with a velocity from said integrated GPS/INS to provide a velocity at said remote velocity sensor with respect to a navigation frame of the vehicle.

3. A unit according to claim 2 wherein said unit is configured to integrate the velocity at said remote velocity sensor to provide a position with respect to a navigation frame of the vehicle.

4. A unit according to claim 1 wherein the navigation frame is one of earth centered earth fixed and geodetic wander azimuth.

5. A unit according to claim 1 further configured to provide acceleration, velocity and position data, based upon outputs of said accelerometers combined with position, velocity and attitude data received from said integrated GPS/INS.

6. A unit according to claim 1 wherein delta velocity data is sent from said remote velocity sensor to said integrated GPS/INS.

7. A unit according to claim 6 further configured to provide acceleration, velocity and position data, based upon delta velocity data combined with position, velocity and attitude data as determined by said integrated GPS/INS.

8. A unit according to claim 1 wherein said unit comprises a fusion filter, said filter configured to provide a corrected position and velocity of said remote velocity sensor based upon remote velocity sensor generated position and velocity data and an estimated position and velocity of said remote velocity sensor determined by said GPS/INS.

9. A unit according to claim 8 wherein said fusion filter is configured to:
 determine a difference between a velocity as measured by said GPS/INS and transformed to a position of said remote velocity sensor and a velocity generated by said remote velocity sensor; and
 utilize the difference to remove low frequency errors within the velocity generated by said remote velocity sensor.

10. A unit according to claim 8 wherein said fusion filter is configured to:
 determine a difference between a position as measured by said GPS/INS and transformed to a position of said remote velocity sensor and a position generated by said remote velocity sensor; and
 utilize the difference to remove low frequency errors within the position generated by said remote velocity sensor.

11. A unit according to claim 1 wherein the sensor frame to navigation frame attitude matrix is transmitted from said integrated GPS/INS to said digital signal processor.

12. A unit according to claim 1 wherein delta velocities from said remote velocity sensor are transformed utilizing the sensor frame to navigation frame attitude matrix within said integrated GPS/INS.

13. A unit according to claim 1 wherein said remote velocity sensor comprises input and output capability to receive position, velocity and attitude data from said integrated GPS/INS.

14. A method for removing a low frequency drift in data from a remote velocity sensor, the data including position, velocity, and acceleration data, the remote velocity sensor including a digital signal processor (DSP) and three orthogonal accelerometers providing signals to the DSP which generates the data, the remote velocity sensor configured for communication with an integrated global positioning satellite system (GPS)/inertial navigation system (INS), said method comprising:
 receiving data from the remote velocity sensor;
 receiving data from the integrated GPS/INS; and
 transforming the data from the remote velocity sensor data to the data from the integrated GPS/INS using a sensor frame to navigation frame attitude matrix;
 determining a difference between a velocity as measured by the GPS/INS and transformed to a position of the remote velocity sensor and a velocity as measured by the remote velocity sensor; and
 utilizing the difference to remove low frequency errors within the data generated by the remote velocity sensor.

15. A method according to claim 14 further comprising determining a velocity at the remote velocity sensor position with respect to the navigation frame.

16. A method according to claim 15 further comprising integrating the velocity to determine a position with respect to the remote velocity sensor.

17. A method according to claim 14 wherein receiving data from the remote velocity sensor comprises forming acceleration, velocity and position outputs in the digital signal processor of the remote velocity sensor based upon accelerometer outputs.

18. A method according to claim 14 wherein transforming the data comprises:
 transmitting the attitude matrix from the integrated GPS/INS to the remote velocity sensor; and
 sending position, velocity and attitude data from the integrated GPS/INS to the remote velocity sensor.

19. A method according to claim 14 wherein transforming the data comprises transmitting high frequency delta velocities to the integrated GPS/INS from the remote velocity sensor.

20. A filter configured to:
 receive global positioning satellite system (GPS)/inertial navigation system (INS) position, velocity, and attitude data and remote velocity sensor (RVS) position and velocity data, the RVS position and velocity data based on signals from three orthogonal accelerometers and the GPS/INS position, velocity and attitude data;
 integrate the GPS/INS velocity over a filter period;
 integrate the RVS velocity over the filter period;
 form a difference between the RVS velocity integration and the GPS/INS integration; and
 correct a RVS velocity solution based on the difference, the difference removing low frequency errors within the data generated by the remote velocity sensor.

21. A filter according to claim 20 further configured to:
 form a difference between a RVS velocity position and GPS/INS position; and
 correct a RVS position solution based on the difference.

22. A filter according to claim 21 configured to:
 propagate filter error state estimates and uncertainties; and
 update the error state estimates and uncertainties based upon the differences in velocity and position.

* * * * *